United States Patent [19]

Beever

[11] Patent Number: 4,992,229
[45] Date of Patent: Feb. 12, 1991

[54] THERMOPLASTIC RE-PULTRUSION
[75] Inventor: William H. Beever, Bartlesville, Okla.
[73] Assignee: Phillips Petroleum Company, Bartlesville, Okla.
[21] Appl. No.: 311,132
[22] Filed: Feb. 14, 1989
[51] Int. Cl.$^5$ .................. B29C 55/30; B29C 67/14
[52] U.S. Cl. .................. 264/280; 156/199; 264/323
[58] Field of Search ............ 264/280, 323; 156/199
[56] References Cited

U.S. PATENT DOCUMENTS

| 3,400,195 | 9/1968 | Weinberger | 264/320 |
| 3,670,062 | 6/1972 | Nowicki | 264/97 |
| 3,684,622 | 8/1972 | Goldsworthy | 156/441 |
| 3,793,108 | 2/1974 | Goldsworthy | 156/180 |
| 3,993,726 | 11/1976 | Moyer | 264/280 |
| 4,058,581 | 11/1977 | Park | 264/137 |
| 4,249,980 | 2/1981 | Shobert et al. | 156/441 |
| 4,329,307 | 5/1982 | Westcott et al. | 264/160 |
| 4,680,224 | 7/1987 | O'Connor | 428/294 |

FOREIGN PATENT DOCUMENTS

| 2082112 | 3/1982 | United Kingdom. | |
| 2154500 | 9/1985 | United Kingdom | 264/280 |

OTHER PUBLICATIONS

Modern Plastics Encyclopedia 1985–1986, p. 69.
Kirk–Othmer Encyclopedia of Chemical Technology, 3rd Ed., vol. 18, pp. 184–185.

Primary Examiner—James Lowe
Attorney, Agent, or Firm—Laney, Dougherty, Hessin & Beavers

[57] ABSTRACT

A process for re-shaping a previously pultruded thermoplastic article having a first longitudinal cross-sectional area and a first longitudinal cross-sectional configuration into a new thermoplastic article having approximately the same longitudinal cross-sectional area but a substantially different longitudinal cross-sectional configuration.

15 Claims, 2 Drawing Sheets

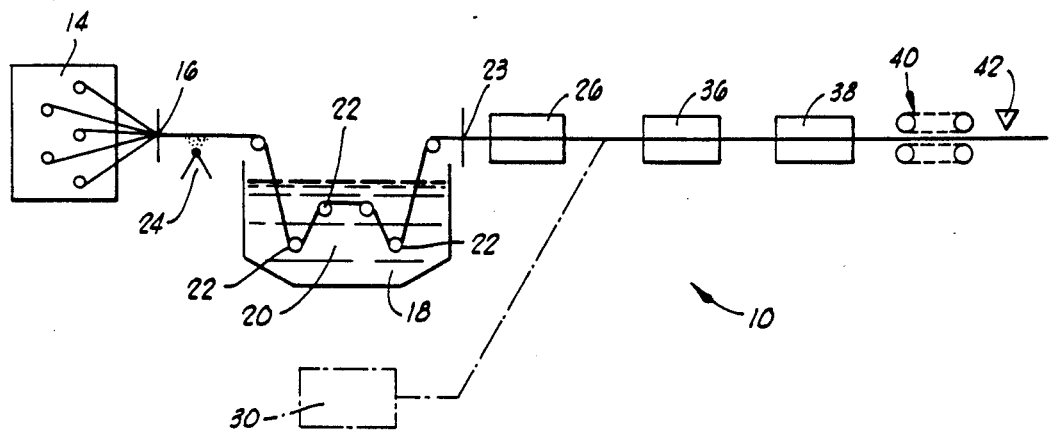
FIG. 1 PRIOR ART
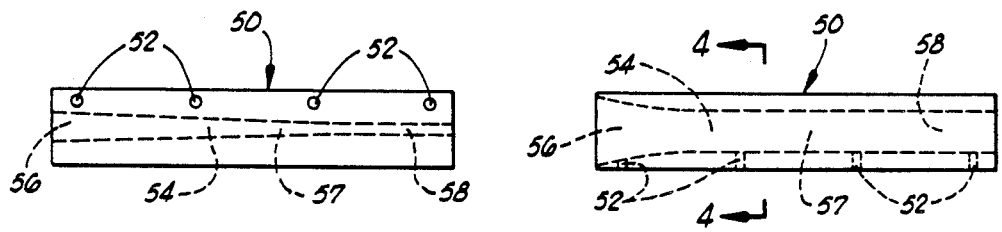
FIG. 2 PRIOR ART  FIG. 3 PRIOR ART
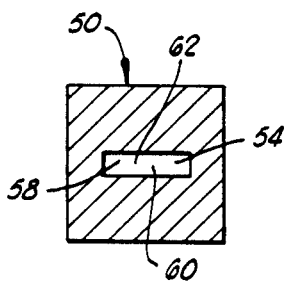
FIG. 4 PRIOR ART
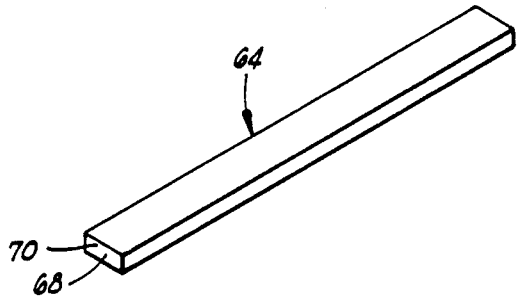
FIG. 5

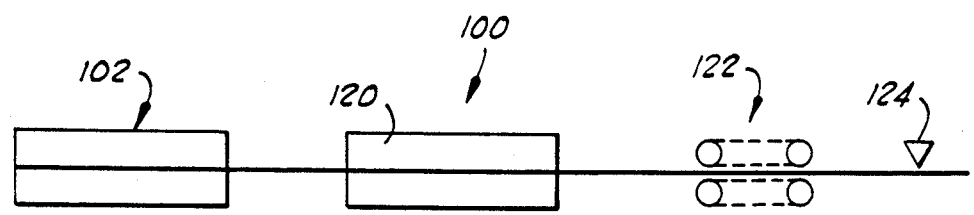
FIG. 6
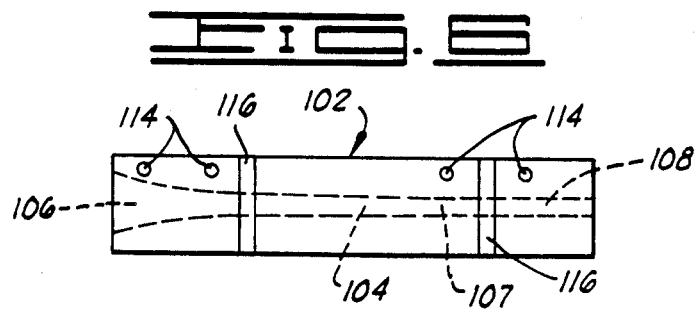
FIG. 7
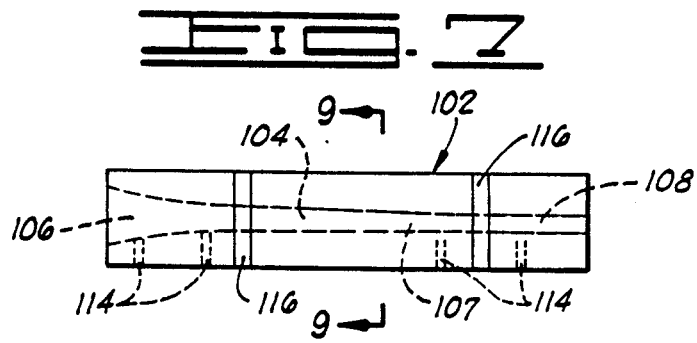
FIG. 8
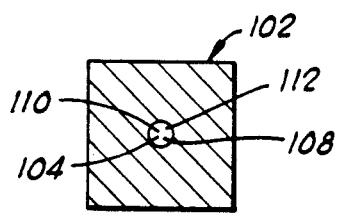
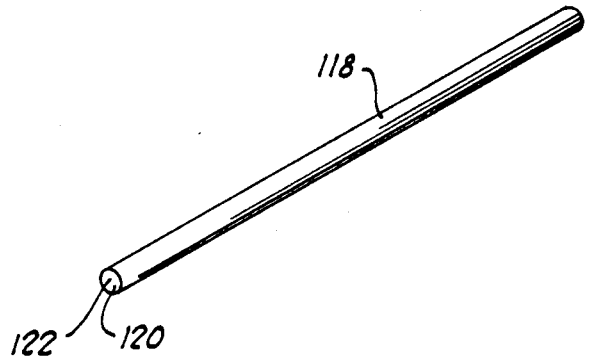
FIG. 9
FIG. 10

THERMOPLASTIC RE-PULTRUSION

BACKGROUND OF THE INVENTION

1. Field of the Invention.

This invention relates to processes for producing reinforced plastic articles, and more particularly, to processes for pultruding fiber reinforced thermoplastic articles.

2. Description of the Prior Art.

Processes for producing fiber reinforced plastic articles by the technique of pultrusion are well known. In such a process, prepreg feed material comprising a plurality of reinforcing fiber strands surrounded by a resin matrix is pulled through a heated forming die. Common types of articles produced by pultrusion processes include channels, rods, bars and slats. Although pultrusion processes were limited to the use of thermoset resins at one time, pultrusion processes for forming reinforced plastic articles from thermoplastic resins have now been developed.

Most pultrusion processes can be characterized as either wet or dry. In a wet pultrusion process, a plurality of fiber strands are pulled from a creel and through a resin bath for impregnation of the strands with the resin. Typically, excess resin is then removed from the strands. The resin impregnated fiber strands, now referred to as "prepreg feed material", are then pulled through a heated forming die and cooled to form a plastic composite or article of a continuous length. The article is typically cut into long portions which are either stored or transported elsewhere for further processing.

Dry pultrusion processes do not include the step of passing a plurality of fiber strands through a resin bath and the other steps associated with initially forming the resin impregnated fiber strands or prepreg feed material. In a dry pultrusion process, the prepreg feed material fed into the heated forming die is pre-impregnated material formed in a separate process. Such pre-impregnated material can be, for example, unidirectional tape or fabric prepreg. As in wet pultrusion processes, the prepreg feed material is pulled through a heated forming die and cooled to form an article of continuous length.

By the present invention, it has been discovered that a previously pultruded article having a substantially different shape than the final product can be employed as the prepreg feed material fed into the heated forming die in a dry pultrusion process. As long as it has approximately the same longitudinal cross-sectional area or volume, the prepreg feed material can have any longitudinal cross-sectional configuration. In this way, previously pultruded articles such as rods can be re-pultruded into different articles such as bars or various types of beams. This expands the utility of pultrusion processes in general and expands the utility of the articles produced thereby.

SUMMARY OF THE INVENTION

The present invention provides a process for re-shaping a previously pultruded elongated thermoplastic article having a particular longitudinal cross-sectional area and a particular longitudinal cross-sectional configuration into a new elongated thermoplastic article having approximately the same longitudinal cross-sectional area and a substantially different longitudinal cross-sectional configuration. The process comprises the steps of pulling the previously pultruded article into an elongated die, the die comprising a final forming zone having a longitudinal cross-sectional area approximately equal to the longitudinal cross-sectional area of the previously pultruded article and a longitudinal cross-sectional configuration substantially different from the longitudinal cross-sectional configuration of the previously pultruded article, applying sufficient heat to the previously pultruded article to soften the article sufficiently to permit it to be re-shaped, and pulling the previously pultruded article through the final forming zone of the die whereby the article is re-shaped to have a longitudinal cross-sectional area and a longitudinal cross-sectional configuration approximately equal to the longitudinal cross-sectional area and longitudinal cross-sectional configuration of the forming zone of the die. Thus, the present invention provides a process for pultruding a new thermoplastic article having a particular longitudinal cross-sectional area and a particular longitudinal cross-sectional configuration wherein the feed prepreg material employed in the process is a previously pultruded thermoplastic article having a longitudinal cross-sectional area approximately equal to the longitudinal cross-sectional area of the new thermoplastic article and a longitudinal cross-sectional configuration substantially different from the longitudinal cross-sectional configuration of the new thermoplastic article.

In a particular embodiment of the process of the present invention, a new thermoplastic article is formed by the steps of pulling thermoplastic feed prepreg material through a first heated elongated die comprising a final forming zone having a first longitudinal cross-sectional area and a first longitudinal cross-sectional configuration to form a first thermoplastic article having a longitudinal cross-sectional area and a longitudinal cross-sectional configuration approximately equal to the first longitudinal cross-sectional area and the first longitudinal cross-sectional configuration, allowing the first thermoplastic article to harden, and pulling the first thermoplastic article through a second heated elongated die comprising a final forming zone having a second longitudinal cross-sectional area approximately equal to the first longitudinal cross-sectional area and a second longitudinal cross-sectional configuration substantially different from the first longitudinal cross-sectional configuration to form a thermoplastic article having a longitudinal cross-sectional area approximately equal to the second longitudinal cross-sectional area and a longitudinal cross-sectional configuration approximately equal to the second longitudinal cross-sectional configuration.

It is, therefore, a principal object of the present invention to provide a new pultrusion process.

It is an object of the present invention to provide a process for re-shaping a previously pultruded thermoplastic article having a particular shape into a new thermoplastic article having a substantially different shape.

It is an object of the present invention to provide a new pultrusion process whereby unneeded thermoplastic articles can be re-shaped into needed thermoplastic articles.

A further object of the present invention is to provide a pultrusion process wherein new thermoplastic articles are pultruded in the absence of slurry baths, drying chambers and other process equipment required to form the initial prepreg feed material.

Other objects, features, uses and advantages of the present invention will be readily apparent to those skilled in the art upon a reading of the following description of the preferred embodiments of the present invention.

BRIEF DESCRIPTION OF THE DRAWINGS

FIG. 1 is a line representation of a prior art pultrusion process.

FIG. 2 is a side view of a prior art die that can be used in a process for pultruding a thermoplastic article having the longitudinal cross-sectional shape of a bar.

FIG. 3 is a top view of the die shown in FIG. 2.

FIG. 4 is a cross-sectional view taken along the line 4—4 in FIG. 3.

FIG. 5 is a perspective view of a thermoplastic article having the longitudinal cross-sectional shape of a bar, as formed in a pultrusion process employing the die shown in FIGS. 2–4.

FIG. 6 is a line representation of the pultrusion process of the present invention. FIG. 7 is a side view of the die represented in FIG. 6.

FIG. 8 is a top view of the die shown in FIG. 7.

FIG. 9 is a cross-sectional view taken along line 9—9 of FIG. 8.

FIG. 10 is a perspective view of a thermoplastic article having the longitudinal cross-sectional shape of a rod, as formed by the die shown in FIGS. 6–9.

DESCRIPTION OF THE PREFERRED EMBODIMENTS

As used herein and in the appended claims, "substantially different longitudinal cross-sectional configuration" means substantially different shape or profile, e.g., a rod as opposed to a bar. Thus, a forming zone of a die having a longitudinal cross-sectional configuration substantially different from the longitudinal cross-sectional configuration of a bar would be a forming zone of a die having the longitudinal shape or profile of, for example, a rod or a top hat. An article having a longitudinal cross-sectional configuration substantially different from the longitudinal cross-sectional configuration of a channel would be, for example, a slat.

Referring now to FIG. 1, a prior art apparatus for pultruding reinforced plastic articles is illustrated and generally designated by the numeral 10.

A single fiber strand or a multiplicity of fiber strands are pulled from a creel 14 through a roving guide 16 and through a resin slurry bath 18. In the resin slurry bath 18, the fibers are impregnated with a plastic resin 20. If desired, a dry resin powder can be substituted for the resin slurry in the resin bath 18.

The fiber strands are passed around a plurality of redirect bars 22 as they are pulled through the resin slurry bath 18 to spread the strands in the bath. If desired, the fibers can be sprayed by a spray nozzle 24 with a flow of gaseous fluid before they are pulled through the resin slurry bath 18. The flow of gaseous fluid is sprayed into contact with the fiber strands with sufficient velocity to spread the individual strands so that single filaments or bundles of single filaments are separated. Separation of the fiber strands prior to or in the resin slurry bath 18 allows better contact of the fiber with the resin.

After passing through the resin slurry bath 18, the impregnated fiber strands are pulled through a guide mechanism 23 and through a heated drying chamber 26. The heated drying chamber 26 removes the slurry diluent from the impregnated fiber strands leaving prepreg feed material ready to be formed into the desired shape.

In an alternate embodiment, the creel 14, resin slurry bath 18, drying chamber 26 and other apparatus used to initially form the prepreg feed material are replaced by prepreg feed material supply means 30. The prepreg feed material supply means 30 provides pre-impregnated prepreg feed material that is formed in a separate process. The pre-impregnated prepreg feed material can be, for example, unidirectional tape or fabric prepreg.

After being pulled from the heated drying chamber 26, or alternatively, the prepreg feed material supply means 30, the prepreg feed material is pulled through a heated elongated forming die 36. If desired, the prepreg feed material can be pulled through other process apparatus such as a preheating chamber and a shape preformer before being pulled into the forming die 36. The prepreg feed material, now a formed thermoplastic article having a particular longitudinal cross-sectional area and a particular longitudinal cross-sectional configuration, is pulled out of the forming die 36 and into a cooling die 38. In the cooling die 38, the formed thermoplastic article is cooled at a rate sufficient to harden the article whereby the article retains the particular longitudinal cross-sectional configuration provided to it by the forming die 36. A gripping or pulling mechanism 40 is used to pull the reinforcing fibers and thermoplastic matrix through the resin bath 18, forming die 36, cooling die 38 and other process apparatus. After passing through the pulling mechanism 40, the formed thermoplastic article is cut into desired lengths by a cutting device 42. Typically, the article is cut into long lengths and stored or transported for further processing. In an alternate embodiment, the formed thermoplastic article can be wound upon a rotating mandrel. The wound article can be reheated and unwound at another destination or can be used to form hollow shaped objects.

As will be understood by those skilled in the art, the above-described pultrusion apparatus and process can be modified in many ways. A great deal of additional apparatus and steps can be employed. The particular apparatus and steps employed will depend, to a large extent, on the particular nature and shape of the article being formed. A pultrusion process for forming fiber reinforced poly(arylene sulfide) articles is disclosed in U.S. Pat. No. 4,680,224, issued July 14, 1987 and assigned to the assignee of the present application, which is incorporated by reference herein.

Referring now to FIGS. 2–4, a prior art forming die is illustrated and generally designated by the numeral 50. The die 50 is equipped with means for providing heat to the die and hence to the article (not shown), and a plurality of thermocouples 52 for monitoring the temperature throughout the length thereof. The means for providing heat to the die and hence to the article can comprise, for example, a plurality of electric strip heaters attached to the die. The die 50 comprises a single cavity 54 having a funnel-shaped mouth 56, an initial forming zone 57 and a final forming zone 58. The funnel-shaped mouth 56 allows for easier entrance of the fiber strands into the cavity 54. The initial forming zone 57 is tapered from the funnel-shaped mouth 56 to the final forming zone 58 to allow for gradual compaction of the fiber strands as they pass therethrough. The final forming zone 58 has a constant longitudinal cross-sectional area or volume 60 and a constant longitudinal cross-sectional configuration 62. The longitudinal cross-sectional configuration 62 of the final forming zone 58 replicates the longitudinal cross-sectional configuration of a bar.

FIG. 5 illustrates a bar 64 formed by the forming die 50. As shown, the bar 64 has a longitudinal cross-sectional area 68 and a longitudinal cross-sectional configuration 70 that are approximately equal to the longitudinal cross-sectional area 60 and longitudinal cross-sectional configuration 62 of the final forming zone 58 of the cavity 54 of the die 50.

As will be understood by those skilled in the art, the longitudinal cross-sectional area and the longitudinal cross-sectional configuration of the initial forming zone 57 and the final forming zone 58 of the cavity 54 of the forming die 50 can vary. The longitudinal cross-sectional area will vary depending upon the size of the composite or article that is formed. The longitudinal cross-sectional configuration will vary depending upon the type of composite or article that is formed. For example, the longitudinal cross-sectional configuration of the final forming zone 58 and the composites produced therefrom can be that of a bar, a rod, a channel, a slat, an "I"-shaped beam, a "top hat"-shaped beam, a "rectangular"-shaped beam, a "T"-shaped beam, a "J"-shaped beam, a "G"-shaped beam, a "L"-shaped beam and the like.

In accordance with the process of the present invention, a previously pultruded elongated thermoplastic article having a particular longitudinal cross-sectional area and a particular longitudinal cross-sectional configuration is reshaped into a new elongated thermoplastic article having approximately the same longitudinal cross-sectional area but a substantially different longitudinal cross-sectional configuration. Conventional pultrusion apparatus can be employed in carrying out the process.

Referring now to FIGS. 6-10, apparatus for carrying out the process of the present invention is illustrated and generally designated by the numeral 100. Except for the resin slurry bath 18, drying chamber 26, and other apparatus used to initially form the prepreg feed material, or alternatively the prepreg feed material supply means 30, the apparatus used to carry out the process of the present invention is the same as the prior art apparatus illustrated in FIG. 1. The process of the present invention differs from prior art thermoplastic pultrusion processes only in that a previously pultruded article having a longitudinal cross-sectional area approximately equal to and a longitudinal cross-sectional configuration substantially different from the new thermoplastic article formed by the process is employed as the prepreg feed material fed into the heated forming die used to form the new thermoplastic article.

The previously pultruded thermoplastic article is first pulled into an elongated heated forming die 102. As shown in FIGS. 7-9, the elongated forming die 102 comprises a single cavity 104 having a funnel-shaped mouth 106, an initial forming zone 107 and a final forming zone 108. The funnel-shaped mouth 106 allows for easy entrance of the previously pultruded article into the cavity 104. The initial forming zone 107 is tapered from the funnel-shaped mouth 106 to the final forming zone 108 to allow for gradual compaction of the previously pultruded article into the final shape. The final forming zone 108 has a constant longitudinal cross-sectional area 110 and a constant longitudinal cross-sectional configuration 112. As illustrated, the longitudinal cross-sectional configuration 112 of the final forming zone 108 replicates the longitudinal cross-sectional configuration of a rod.

The longitudinal cross-sectional area 110 and the longitudinal cross-sectional configuration 112 of the final forming zone 108 can vary as long as the longitudinal cross-sectional area 110 is approximately equal to the longitudinal cross-sectional area of the previously pultruded article and as long as the longitudinal cross-sectional configuration 112 is substantially different from the longitudinal cross-sectional configuration of the previously pultruded article. For example, the longitudinal cross-sectional configuration of the final forming zone 108 and the new thermoplastic composites or articles produced therefrom can be that of a bar, a rod, a channel, a slat, an "I"-shaped beam, a "top hat"-shaped beam, a "rectangular"-shaped beam, a "T"-shaped beam, a "J"-shaped beam, a "G"-shaped beam, a "L"-shaped beam and the like.

The forming die 102 is equipped with a plurality of thermocouples 114 for measuring the temperature throughout the length of the die. The die is also equipped with electrical strip heaters 116 for providing heat to the die.

Once the previously pultruded article is pulled into the die 102, sufficient heat is applied to the article by the electric strip heaters 116 to soften the article sufficiently to permit it to be re-shaped. After the previously pultruded article has been softened sufficiently to permit it to be re-shaped, it is pulled through the initial forming zone 107 and then the final forming zone 108 of the cavity 104 of the die 102 whereby the article is re-shaped to have a longitudinal cross-sectional area and a longitudinal cross-sectional configuration approximately equal to the longitudinal cross-sectional area and longitudinal cross-sectional configuration of the forming zone.

FIG. 10 shows a rod 118 formed by pulling a previously pultruded article through the forming die 102. As shown, the rod 118 has a longitudinal cross-sectional area 120 and a longitudinal cross-sectional configuration 122 that are approximately equal to the longitudinal cross-sectional area 110 and the longitudinal cross-sectional configuration 112 of the final forming zone 108 of the cavity 104 of the die 102. As used herein and in the appended claims, approximately equal longitudinal cross-sectional area and/or configuration means a longitudinal cross-sectional area and/or configuration that is either identical to the longitudinal cross-sectional area and/or configuration of the die or article that it is being compared to or only slightly different from the longitudinal cross-sectional area and/or configuration of the die or article that it is being compared to, the slight difference being due to the presence of air trapped in the previously pultruded article and/or to slight expansion and/or contraction of the fiber strands and/or resin matrix during the cooling process.

After pulling the re-shaped article from the forming die 102, the article is optionally pulled through a cooling die 120 to cool the article at a rate sufficient to harden the article whereby the article retains a longitudinal cross-sectional area and a longitudinal cross-sectional configuration approximately equal to the longitudinal cross-sectional area and the longitudinal cross-sectional configuration of the final forming zone 108 of the cavity 104 of the die 102. If desired, the re-shaped article can be air-cooled or cooled by pulling it through a water bath instead of pulling it through the cooling die 120. A gripping or pulling mechanism 122 is used to pull the article through the forming die 102, cooling die 120 and/or other apparatus employed. After passing through the pulling mechanism 122, the article can be cut to any desired length with a cutting device 124. Alternatively, the article can be wound upon a mandrel and shipped or further processed therewith.

As will be understood by those skilled in the art, the nature and type of pultrusion apparatus used to carry out the process of the present invention can be modified in many ways. For example, instead of a single heated forming die, a series of heated forming dies can be used to re-shape the previously pultruded article into a new article. The particular apparatus employed will depend, to a large extent, on the particular nature and shape of the article being formed. Any type of pultrusion apparatus can be employed.

Thus, in accordance with the process of the present invention, a previously pultruded thermoplastic article having a particular longitudinal cross-sectional area and a particular longitudinal cross-sectional configuration can be re-shaped into a different thermoplastic article having approximately the same longitudinal cross-sectional area but a substantially different longitudinal cross-sectional configuration. For example, the bar 64 shown in FIG. 5 can be re-shaped into the rod 118 shown in FIG. 10. Thermoplastic articles having various shapes can be pultruded in the absence of slurry baths, drying chambers and other equipment required to initially form the prepreg feed material. A supply of unneeded previously pultruded thermoplastic articles in storage can be transformed into a supply of needed thermoplastic articles.

The process of the present invention can be combined with conventional pultrusion processes to produce one or more new thermoplastic articles. For example, a new thermoplastic article can be formed by pultruding a first thermoplastic article having one longitudinal cross-sectional configuration, and then re-pultruding the first thermoplastic article to form a second thermoplastic article having a substantially different longitudinal cross-sectional configuration. First, thermoplastic prepreg feed material is pulled through a first heated elongated die comprising a final forming zone having a first longitudinal cross-sectional area and a first longitudinal cross-sectional configuration to form a first thermoplastic article having a longitudinal cross-sectional area and a longitudinal cross-sectional configuration approximately equal to the first longitudinal cross-sectional area and the first longitudinal cross-sectional configuration. Next, before or after it hardens, the first thermoplastic article is pulled through a second heated elongated die comprising a final forming zone having a second longitudinal cross-sectional area approximately equal to the first longitudinal cross-sectional area and a second longitudinal cross-sectional configuration substantially different from the first longitudinal cross-sectional configuration to form a new thermoplastic article having a longitudinal cross-sectional area approximately equal to the second longitudinal cross-sectional area and a longitudinal cross-sectional configuration approximately equal to the second longitudinal cross-sectional configuration.

Thus, a first thermoplastic article such as the bar 64 shown in FIG. 5 can be formed by pulling thermoplastic prepreg feed material through a forming die such as the die 50 shown in FIGS. 2-4. The first thermoplastic article can then be pulled through a second heated elongated die such as the die 102 illustrated in FIGS. 7-9 to form a new thermoplastic article such as the rod 118 illustrated in FIG. 10.

A die series can be set up that allows two different thermoplastic articles to be produced. For example, pultrusion apparatus such as the pultrusion apparatus illustrated in FIG. 1 can be combined with pultrusion apparatus such as the pultrusion apparatus illustrated in FIG. 6. A thermoplastic article having the longitudinal cross-sectional configuration of a bar can be pulled through the forming die 50 and cut at certain intervals to form a plurality of bars. In a second run, the thermoplastic article pulled from the die 50 can be fed directly into the forming die 102 to form a thermoplastic article having the longitudinal cross-sectional configuration of a rod which can be cut at certain intervals to form a plurality of rods. In this way, two types of thermoplastic articles can be produced in a single die series.

The thermoplastic articles used in carrying out the process of the present invention and therefore the thermoplastic articles formed in accordance with the process of the present invention all comprise pultruded fiber reinforced thermoplastic articles having a longitudinal axis and at least one reinforcing fiber strand of continuous filaments aligned parallel to the longitudinal axis. The reinforcing fiber strand of continuous filaments is impregnated and surrounded by a continuous thermoplastic matrix. Inasmuch as thermoset resin cannot be re-heated and re-shaped, the matrix impregnating and surrounding the fiber strand or strands must be formed of a thermoplastic resin.

Examples of thermoplastic resins suitable for use in forming the thermoplastic matrix of the thermoplastic articles used in carrying out the process of the present invention are polyolefins such as polypropylene and polyamides such as Nylon. Polyesters, polycarbonates and high performance thermoplastics such as polyetherether ketone (PEEK), polyetherimide, polyphenylene diketone (PPDK) and liquid crystal polymers can also be used. Preferably, the thermoplastic resin used to form the matrix of the thermoplastic articles used in carrying out the process of the present invention comprise a poly(arylene sulfide) (PAS) polymer. More preferably, the thermoplastic resin used to form the matrix of the thermoplastic articles used in carrying out the process of the present invention is selected from the group consisting of poly(phenylene sulfide), poly(biphenylene sulfide), poly(arylene sulfide arylene ketone), poly(arylene sulfide arylene sulfone), and poly(ether ether ketone).

The reinforcing fiber strand or strands of continuous filaments used to form the thermoplastic articles used in carrying out the process of the present invention and therefore the thermoplastic articles formed in accordance with the process of the present invention can be any fiber strand or strands that do not decompose prior to reaching the processing temperature for the thermoplastic resin used to form the matrix. Preferably, the reinforcing fiber strand or strands used to form the thermoplastic articles used in carrying out the process of the present invention are selected from the group consisting of carbon fiber strands, glass fiber strands and aramid fiber strands.

The thermoplastic articles used in carrying out the processes of the present invention and thus formed in accordance with the process of the present invention preferably have longitudinal cross-sectional areas in the range of from about 0.005 square inches to about 20 square inches.

The following example is provided to further illustrate the present invention.

EXAMPLE

This example illustrates use of the process of the present invention to re-shape a previously pultruded 0.5 inch by 0.1 inch bar into a ¼ inch diameter rod.

The 0.5 inch by 0.1 inch bar comprised 36 strands of carbon fiber and a continuous poly(phenylene sulfide) matrix impregnating and surrounding the strands. The bar contained in the range of from about 67.7% to about 72.1% by weight fiber. The bar was pultruded by pulling the fiber strands through a slurry bath of the polymer and then through the forming zone of an elongated heated die operating at 375° C.

To re-shape the bar into the rod, the bar was pulled through the forming zone of an elongated heated die operating at 400° C. The longitudinal cross-sectional configuration of the forming zone was circular. The diameter of the final forming zone was ¼ of an inch. The bar was pulled through the die at a speed of 8 inches per minute. Upon exiting the final forming zone of the die, the previously pultruded bar had the shape of a rod. The rod was cooled by pulling it through an elongated cooling die. The diameter of the final forming zone of the cooling die was ¼ of an inch.

Thus, the present invention can be used to re-shape a previously pultruded elongated thermoplastic article having a particular longitudinal cross-sectional area and a particular longitudinal cross-sectional configuration into a different elongated thermoplastic article having approximately the same longitudinal cross-sectional area but a substantially different longitudinal cross-sectional configuration.

The preceding example can be repeated with similar success by substituting the generically or specifically described components, operating conditions and/or process equipment of the invention for those used in the example.

From the foregoing description, one skilled in the art can easily ascertain the essential characteristics of the invention, and without departing from the scope and spirit thereof, can make various changes and modifications to the invention to adapt it to various usages and conditions.

What is claimed is:

1. A process for re-shaping a previously pultruded elongated thermoplastic article having a particular longitudinal cross-sectional area and a particular longitudinal cross-sectional configuration into a new elongated thermoplastic article having approximately the same longitudinal cross-sectional area but a substantially different longitudinal cross-sectional configuration comprising:

pulling said previously pultruded article into an elongated die, said die comprising a final forming zone having a longitudinal cross-sectional area approximately equal to the longitudinal cross-sectional area of said article and a longitudinal cross-sectional configuration substantially different from the longitudinal cross-sectional configuration of said article;

applying sufficient heat to said previously pultruded article to soften said article sufficiently to permit it to be re-shaped; and pulling said previously pultruded article through said final forming zone of said die whereby said article is re-shaped to have a longitudinal cross-sectional area and a longitudinal cross-sectional configuration approximately equal to the longitudinal cross-sectional area and longitudinal cross-sectional configuration of said final forming zone of said die.

2. The process of claim 1 further comprising the step of after pulling said previously pultruded article through said forming zone of said die, cooling said article at a rate sufficient to harden said article whereby said article retains a longitudinal cross-sectional area and a longitudinal cross-section configuration approximately equal to the longitudinal cross-sectional area and the longitudinal cross-sectional configuration of the final forming zone of the die.

3. The process of claim 1 wherein said previously pultruded article comprises at least one reinforcing fiber strand of continuous filaments and a continuous thermoplastic matrix impregnating and surrounding said fiber strand.

4. The process of claim 3 wherein said thermoplastic matrix comprises a poly(arylene sulfide) polymer.

5. The process of claim 4 wherein said poly(arylene sulfide) polymer is selected from the group consisting of poly(phenylene sulfide), poly(biphenylene sulfide), poly(arylene sulfide arylene ketone), poly(arylene sulfide arylene sulfone), and poly(ether ether ketone).

6. The process of claim 5 wherein said poly(arylene sulfide) polymer is a poly(phenylene sulfide) polymer.

7. The process of claim 3 wherein said fiber strand is selected from the group consisting of carbon fiber strands, glass fiber strands and aramid fiber strands.

8. The process of claim 1 wherein said previously pultruded article has a longitudinal cross-sectional area in the range of from about 0.005 square inches to about 20 square inches.

9. The improvement of claim 8 wherein said previously pultruded thermoplastic article comprises at least one reinforcing fiber strand of continuous filaments and a continuous thermoplastic matrix impregnating and surrounding the fiber strand.

10. The improvement of claim 9 wherein said thermoplastic matrix comprises a poly(arylene sulfide) polymer.

11. The improvement of claim 10 wherein said poly(arylene sulfide) polymer is selected from the group consisting of poly(phenylene sulfide) polymers, poly(biphenylene sulfide) polymers, poly(arylene sulfide arylene ketone) polymers, poly(arylene sulfide arylene sulfone) polymers, and poly(ether ether ketone) polymers.

12. The improvement of claim 11 wherein said poly(arylene sulfide) polymer is a poly(phenylene sulfide) polymer.

13. The improvement of claim 9 wherein said fiber strand is selected from the group consisting of carbon fiber strands, glass fiber strands and aramid fiber strands.

14. In a process for forming a new thermoplastic article having a first longitudinal cross-sectional area and a first longitudinal cross-sectional configuration wherein a thermoplastic feed prepreg material is pulled through a heated elongated die comprising a final forming zone having a longitudinal cross-sectional area and a longitudinal cross-sectional configuration approximately equal to said first longitudinal cross-sectional area and said first longitudinal cross-sectional configuration to form said thermoplastic feed prepreg material into said new thermoplastic article, the improvement comprising:

employing as said thermoplastic prepreg feed material a previously pultruded thermoplastic article having a longitudinal cross-sectional area approximately equal to said fist longitudinal cross-sectional area and a longitudinal cross-sectional configuration substantially different from said first longitudinal cross-sectional configuration.

15. The improvement of claim 14, wherein said previously pultruded thermoplastic article has a longitudinal cross-sectional area in the range of from about 0.005 square inches to about 20 square inches.

* * * * *